US007921555B2

(12) United States Patent
Benz et al.

(10) Patent No.: US 7,921,555 B2
(45) Date of Patent: Apr. 12, 2011

(54) PISTON FOR AN INTERNAL COMBUSTION ENGINE AND METHOD FOR ITS PRODUCTION

(75) Inventors: Arnold Benz, Aichwald (DE); Helmut Kollotzek, Mutlangen (DE); Markus Leitl, Remshalden (DE); Sven Schilling, Korb (DE); Ernst Limbach, Remshalden (DE); Josip Zvonkovic, Weinstadt (DE)

(73) Assignee: Mahle International GmbH, Stuttgart (DE)

( * ) Notice: Subject to any disclaimer, the term of this patent is extended or adjusted under 35 U.S.C. 154(b) by 385 days.

(21) Appl. No.: 12/086,841

(22) PCT Filed: Dec. 15, 2006

(86) PCT No.: PCT/DE2006/002255

§ 371 (c)(1), (2), (4) Date: Jul. 8, 2008

(87) PCT Pub. No.: WO2007/073719

PCT Pub. Date: Jul. 5, 2007

(65) Prior Publication Data

US 2009/0025550 A1 Jan. 29, 2009

(30) Foreign Application Priority Data

Dec. 21, 2005 (DE) ......................... 10 2005 061 075

(51) Int. Cl.

| | |
|---|---|
| ***B22C 9/00*** | (2006.01) |
| ***B22C 9/10*** | (2006.01) |
| ***B22D 19/00*** | (2006.01) |
| ***B23P 15/10*** | (2006.01) |
| ***F01P 1/04*** | (2006.01) |
| ***F16J 1/00*** | (2006.01) |

(52) U.S. Cl. ............ 29/888.04; 29/888.042; 29/888.07; 92/172; 123/41.35; 164/349; 164/364

(58) Field of Classification Search .............. 29/888.04, 29/888.042, 888.047; 92/172; 123/41.35; 164/349, 369; 249/175, 184
See application file for complete search history.

(56) References Cited

U.S. PATENT DOCUMENTS

| | | | | |
|---|---|---|---|---|
| 3,459,253 A * | 8/1969 | Woolcott | ........................ | 164/36 |
| 4,253,429 A | 3/1981 | Galli | | |
| 4,331,107 A | 5/1982 | Bruni | | |
| 4,506,632 A | 3/1985 | Kanda et al. | | |
| 4,614,219 A * | 9/1986 | Anderson et al. | ............. | 164/369 |
| 4,662,319 A | 5/1987 | Ayoul | | |

(Continued)

FOREIGN PATENT DOCUMENTS

DE 856 535 7/1949

(Continued)

OTHER PUBLICATIONS

International Search Report, Apr. 13, 2007.

*Primary Examiner* — David P Bryant
*Assistant Examiner* — Alexander P Taousakis
(74) *Attorney, Agent, or Firm* — Collard & Roe, P.C.

(57) ABSTRACT

A piston for an internal combustion engine has annular cooling passage arranged in the vicinity of the piston crown and radially on the outside, which, in those regions of the pin bosses which lie close to the boss holes, has boss cooling passages which are connected to the cooling passage and are intended for improved cooling of the pin bosses.

6 Claims, 3 Drawing Sheets

U.S. PATENT DOCUMENTS

Figure 1:
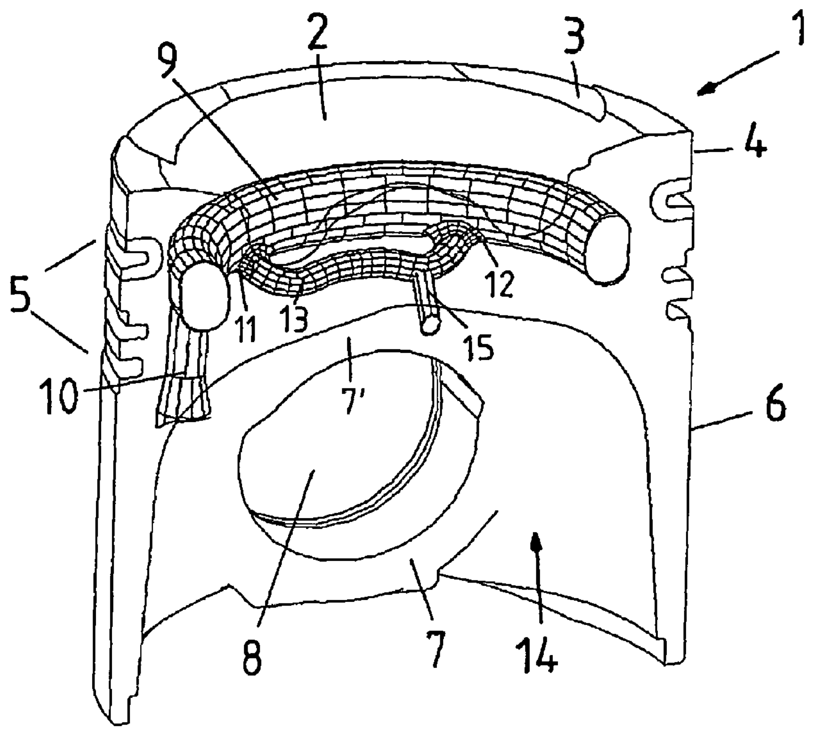

| | | | | |
|---|---|---|---|---|
| 4,891,875 | A * | 1/1990 | Soichi et al. | 29/888.046 |
| 6,760,961 | B2 * | 7/2004 | Upadhya | 29/27 C |
| 7,281,466 | B1 * | 10/2007 | Wilksch et al. | 92/186 |

FOREIGN PATENT DOCUMENTS

| | | |
|---|---|---|
| DE | 29 09 003 | 10/1979 |
| DE | 30 19 953 | 12/1980 |
| DE | 34 23 889 | 2/1985 |
| DE | 197 47 746 | 11/1998 |
| DE | 199 54 725 | 5/2001 |
| DE | 100 03 821 | 8/2001 |
| DE | 100 81 224 | 8/2001 |
| DE | 100 36 481 | 2/2002 |
| DE | 101 31 725 | 1/2003 |
| GB | 2 349 195 | 10/2000 |
| JP | 58-005455 | 1/1983 |
| JP | 60-227964 | 11/1985 |
| JP | 03-145555 | 6/1991 |
| JP | 03-102043 | 10/1991 |
| JP | 05-086971 | 4/1993 |
| WO | WO 2006/014741 | 2/2006 |

* cited by examiner

PISTON FOR AN INTERNAL COMBUSTION ENGINE AND METHOD FOR ITS PRODUCTION

CROSS REFERENCE TO RELATED APPLICATIONS

This application is the National Stage of PCT/DE2006/002255 filed on Dec. 15, 2006, which claims priority under 35 U.S.C. §119 of German Application No. 10 2005 061 075.7 filed on Dec. 21, 2005. The international application under PCT article 21(2) was not published in English.

The invention relates to a piston for an internal combustion engine, in accordance with the preamble of claim 1, and to a method for its production, in accordance with claim 6.

A composite piston for an internal combustion engine is known from the US patent having the U.S. Pat. No. 4,662,319, which consists of a base piston body having pin bosses and an upper piston part connected with it. The base piston body has a ring-shaped contact surface on the piston crown side, on which the upper piston part rests, and which is connected with the pin bosses by way of conically shaped wall elements. The wall elements form a ring chamber that reaches all the way to the pin bosses, which chamber is covered, on the piston crown side, by a ring element that has openings by way of which cooling oil is introduced into the ring chamber, with which oil the pin bosses are cooled. Furthermore, the ring element ends a recess formed radially on the outside into the underside of the upper piston part, so that a closed, ring-shaped cooling channel for cooling the ring grooves is formed. In this connection, the complicated structure of the piston known from the US patent is a disadvantage, making the production of the piston complicated and expensive.

It is the task of the invention to avoid this disadvantage of the state of the art. This task is accomplished with the characteristics that stand in the characterizing part of the main claim, and with the characteristics of the method claim 6. Practical embodiments of the invention are the object of the dependent claims.

Some exemplary embodiments of the invention will be described below, using the drawing. This shows FIG. 1 a section through a piston, shown in perspective, having a circumferential cooling channel that has a pin boss cooling channel in the region of the pin bosses, in each instance, FIG. 2 a section through the piston shown in perspective, with a cooling channel according to FIG. 2, which has multiple expansions in cross-section, in the manner of humps disposed on the piston crown side, FIG. 3 a section through the piston shown in perspective, with a pin boss cooling channel that is connected with the cooling channel only by way of an oil run-in opening, FIG. 4 a section through the piston shown in perspective, with a cooling channel that has a pin boss cooling channel configured in planar manner and directed radially inward, in the region of the pin bosses, in each instance; and FIG. 5 a block diagram showing the method steps for producing the piston according to the invention.

FIG. 1 shows a piston 1, shown in perspective, for an internal combustion engine, in section, with a combustion chamber bowl 2 in the piston crown 3. The radial outside surface of the piston 1 has a top land 4 that borders on the piston crown 3, and adjacent to that a ring belt 5, followed by a rotating skirt 6. On sides that lie opposite one another, the skirt 6 holds a pin boss 7, in each instance, with a pin bore 8, in each instance.

To cool the combustion chamber bowl 2 and the ring belt 5, the piston 1 has a ring-shaped, circumferential cooling channel 9 in the vicinity of the piston crown, radially on the outside, into which cooling oil is introduced by way of an oil feed channel 10 that opens into the piston interior chamber 14, and out of which the cooling oil is passed again by way of an oil drain channel not shown in the figures, which opens into the piston interior chamber 14.

To cool the piston-crown-side regions 7' of the two pin bosses 7 that lie opposite one another, close to the pin bores 8, the cooling channel 9 is connected with a pin boss cooling channel 13 disposed in the regions 7' of the two pin bosses 7, in each instance, whereby the two pin boss cooling channels 13 are connected with the cooling channel 9 by way of an oil run-in opening 11 and an oil run-off opening 12, in each instance. The two pin boss cooling channels 13 furthermore each have an oil run-off channel 15 that opens into the piston interior chamber 14.

In this connection, a part of the cooling oil sprayed into the cooling channel 9 by way of the oil feed channel 10 is introduced by way of the oil run-in openings 11 in the pin boss cooling channels 13, and after cooling the piston-crown-side regions 7' of the pin bosses 7, it is partly passed into the piston interior chamber 14 by way of the oil run-off channels 15, and partly passed back into the cooling channel 9, by way of the oil run-in openings 12.

Figure 5:
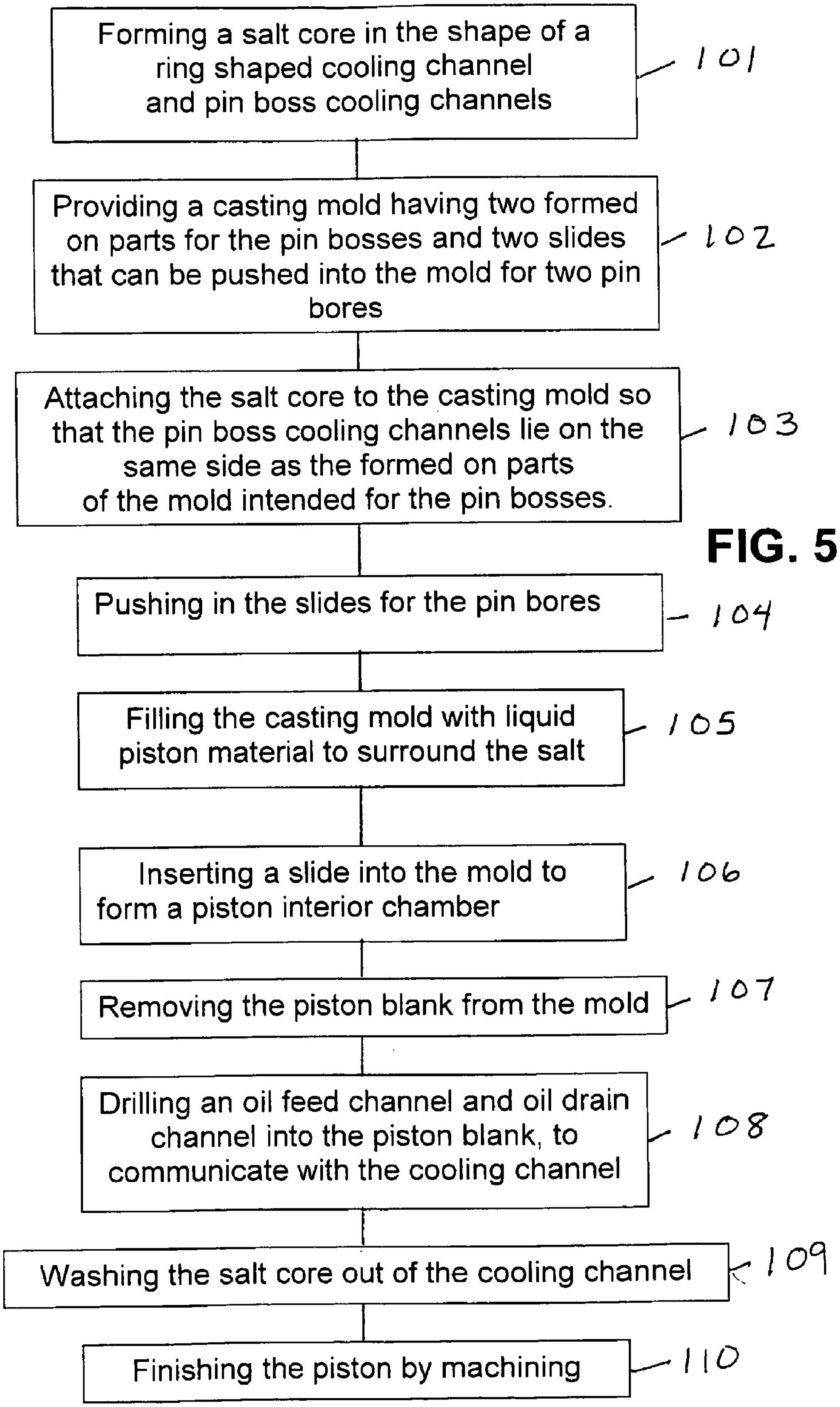

As described in FIG. 5, with reference to FIG. 1, to produce the piston 1 having the cooling channel system according to the invention, first in step 101 a salt core is formed, which has the shape of the ring-shaped cooling channel 9 with two formed on parts in the shape of the pin boss cooling channels 13 formed onto it on one side, each having an oil run-off channel 15 that faces essentially in the axial direction, and faces away from the piston crown. In step 102, a casting mold is provided, which has two formed-on parts complementary to the pin bosses (7), lying opposite one another. The salt core is then laid into a casting mold in step 103. There are two slides that can be pushed into the casting mold in the radial direction, which lie opposite one another, for two pin bores disposed in the pin bosses. The salt core is placed into the casting mold so that the formed-on parts for the pin boss cooling channels (13, 13' 17) come to lie on the side of the formed on parts intended for the pin bosses (7) that faces the piston crown. The slides for the pin bores (8) are pushed in step 104, and the piston material, i.e. aluminum or cast iron in liquid form, is cast around it in step 105. A slide for forming the interior of the piston chamber is pushed into the mold in step 106, and the piston blank is then removed from the casting mold in step 107. Subsequently, the oil feed channel 10 and the oil drain channel, which open into the cooling channel (9, 9', 9'') are drilled into the piston 1 in step 108, and the salt of the salt core is washed out of the piston blank by way of these channels in step 109. Finally, the piston is finished by means of a machining production method in step 110.

As shown in FIG. 1, the other sides of the formed-on parts are each connected with the salt core in the shape of the pin boss cooling channels (13). In another embodiment, as shown in FIG. 4, the formed on parts for the pin boss cooling channels are affixed to the salt core and configured in a planar manner, in a top view.

Figure 2:
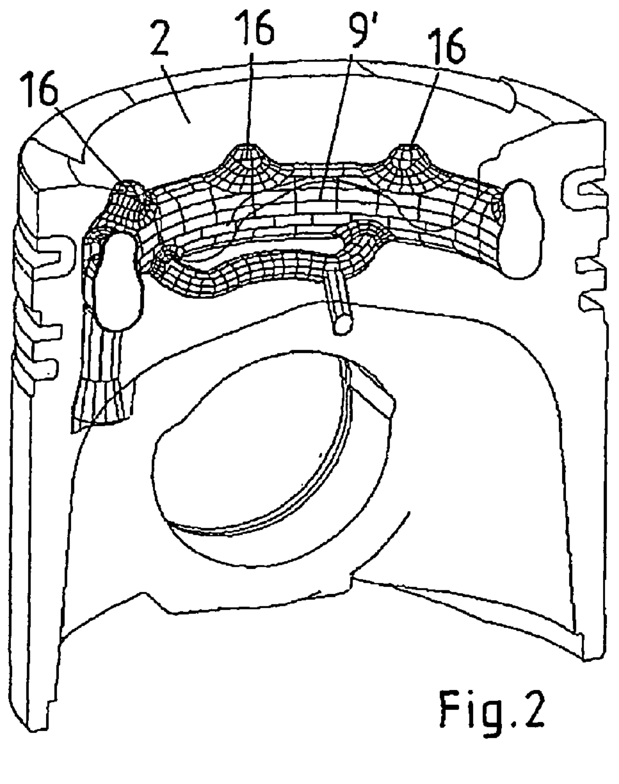

FIG. 2 shows the configuration of a cooling channel 9' that has hump-like cross-section expansions 16 distributed over the entire circumference, disposed on the piston crown side, whose purpose consists in improving the cooling of the edge of the combustion chamber bowl 2, which is subject to high thermal stress, in that the cooling channel 9' reaches closer to the edge of the combustion chamber bowl 2 in the regions of the cross-section expansions 16, so that the cooling oil can also come closer to the bowl edge.

Figure 3:
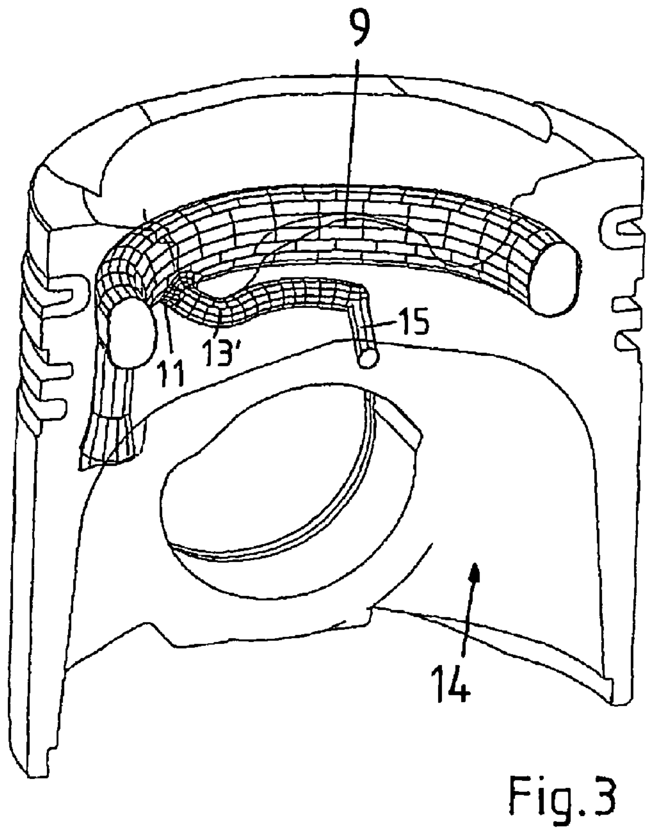

FIG. 3 shows a configuration of the pin boss cooling channel 13' that is connected with the piston interior chamber 14 exclusively by way of the oil run-off channel 15, so that all the oil flowing through the pin boss cooling channel 13' is guided into the piston interior chamber 14.

Figure 4:
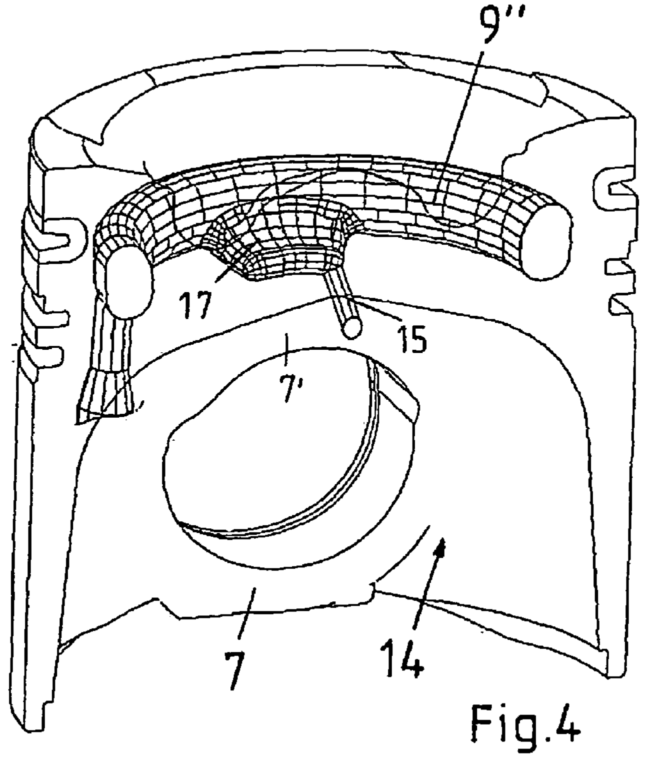

The configuration of the cooling channel 9" according to FIG. 4 has a pin boss cooling channel 17, configured in planar shape in a top view, oriented radially inward, in the piston-crown-side regions 7' of the pin bosses 7, in each instance, from which cooling oil is guided into the piston interior 14 by way of the oil run-off channel 15. A relatively large region of the pin bosses 7 is covered with cooling area that comes into contact with cooling oil, by means of the pin boss cooling channel 17 configured in planar manner, so that in this way, very good cooling of the regions 7' of the pin bosses 7 is achieved.

Reference Symbol List

1 piston
2 combustion chamber bowl
3 piston crown
4 top land
5 ring belt
6 skirt
7 pin boss
7' pin boss region
8 pin bore
9, 9', 9" cooling channel
10 oil feed channel
11 oil run-in opening
12 oil run-off opening
13, 13' pin boss cooling channel
14 piston interior chamber
15 oil run-off channel
16 cross-section expansion
17 pin boss cooling channel

The invention claimed is:

1. Method for the production of a piston (1) for an internal combustion engine, comprising the following method steps:

producing a salt core in the shape of a ring-shaped cooling channel (9, 9', 9"), having two formed-on parts in the shape of pin boss cooling channels (13, 13', 17) disposed on two opposite sides of the salt core, directed radially inward, providing a casting mold for the piston (1), having two formed-on parts complementary to the pin bosses (7), lying opposite one another, and having two slides that can be pushed into the casting mold in the radial direction, which lie opposite one another, for two pin bores (8) disposed in the pin bosses (7), laying and attaching the salt core into the casting mold, in such a manner that the formed-on parts for the pin boss cooling channels (13, 13', 17) come to lie on the side of the formed-on parts intended for the pin bosses (7) that faces the piston crown, pushing in the slide intended for the pin bores (8), filling the casting mold with the piston material present in liquid form, thereby surrounding the salt core, inserting a slide for forming the piston interior chamber (14), removing the piston blank from the casting mold, drilling at least one oil feed channel (10) that opens into the cooling channel (9, 9', 9") and at least one oil drain channel that stands in connection with the cooling channel (9, 9', 9"), washing the salt core out of the cooling channel (9, 9', 9") by way of the oil feed channel (10) and the oil drain channel, and finishing the piston (1) by means of a machining production method.

2. Method according to claim 1, wherein liquid aluminum is cast into the casting mold as the piston material.

3. Method according to claim 1, wherein liquid cast iron is cast into the casting mold as the piston material.

4. Method according to claim 1, wherein the two formed-on parts for the pin boss cooling channels (13'), which are affixed to the salt core and lie opposite one another, are connected with the salt core on one side, in each instance, and have another formed-on part on the other side, in each instance, for an oil run-off channel (15) that faces essentially in the axial direction, and facing away from the piston crown.

5. Method according to claim 4, wherein the other sides of the formed-on parts, in each instance, are connected with the salt core in the shape of the pin boss cooling channels (13).

6. Method according to claim 1, wherein the formed-on parts for the pin boss cooling channels (17), which are affixed to the salt core, are configured in planar manner, in a top view.

* * * * *